US010252203B2

(12) United States Patent
Hartley et al.

(10) Patent No.: US 10,252,203 B2
(45) Date of Patent: Apr. 9, 2019

(54) FILTER WITH ENGINE INTEGRITY PROTECTION

(71) Applicant: CUMMINS FILTRATION IP, INC., Columbus, IN (US)

(72) Inventors: Brian Hartley, Columbus, IN (US); Mark V. Holzmann, Stoughton, WI (US); Dane P. Miller, Monona, WI (US); Gregory K. Loken, Stoughton, WI (US); Scott W. Schwartz, Cottage Grove, WI (US); Carey A. Curt, Cookeville, TN (US)

(73) Assignee: Cummins Filtration IP, Inc., Columbus, IN (US)

( * ) Notice: Subject to any disclaimer, the term of this patent is extended or adjusted under 35 U.S.C. 154(b) by 121 days.

(21) Appl. No.: 15/031,168

(22) PCT Filed: Oct. 17, 2014

(86) PCT No.: PCT/US2014/061125
§ 371 (c)(1),
(2) Date: Apr. 21, 2016

(87) PCT Pub. No.: WO2015/061168
PCT Pub. Date: Apr. 30, 2015

(65) Prior Publication Data
US 2016/0243483 A1    Aug. 25, 2016

Related U.S. Application Data

(60) Provisional application No. 61/894,805, filed on Oct. 23, 2013.

(51) Int. Cl.
*B01D 46/00* (2006.01)
*F02M 35/024* (2006.01)
*B01D 29/05* (2006.01)

(52) U.S. Cl.
CPC ....... *B01D 46/0005* (2013.01); *B01D 46/009* (2013.01); *F02M 35/02416* (2013.01);
(Continued)

(58) Field of Classification Search
CPC ........ B01D 29/01; B01D 27/10; B01D 29/00; B01D 35/30; B01D 46/10; B01D 46/009;
(Continued)

(56) References Cited

U.S. PATENT DOCUMENTS

| 1,794,534 | A | * | 3/1931 | Norquist | ................... | E06B 9/52 |
| | | | | | | 160/381 |
| 3,247,652 | A | * | 4/1966 | Annas | ................... | B01D 46/12 |
| | | | | | | 210/236 |

(Continued)

OTHER PUBLICATIONS

International Search Report and Written Opinion for PCT/US2014/061125, dated Jan. 6, 2015, 8 pages.

*Primary Examiner* — Duane Smith
*Assistant Examiner* — Minh Chau T Pham
(74) *Attorney, Agent, or Firm* — Foley & Lardner LLP

(57) ABSTRACT

A filter system includes a designated filter element including a geometric projection thereon and a filter element housing including an opening keyed to the geometric projection. The opening comprises a recess, a channel or a slot and the recess, the channel, or the slot includes a rib. The geometric projection engages the opening when the designated filter element is installed in the filter element housing, and the filter element housing includes a filter housing body and a filter housing cover.

15 Claims, 16 Drawing Sheets

(52) U.S. Cl.
CPC ...... *B01D 29/05* (2013.01); *B01D 2201/4053* (2013.01); *B01D 2265/026* (2013.01)

(58) Field of Classification Search
CPC ............ B01D 46/0002; B01D 2201/34; B01D 2201/4046; B01D 2271/02; B01D 2271/022
USPC .............. 55/490, 497, 498, 402, 521, 385.3; 210/235, 236, 422, 450, 454; 123/198 E
See application file for complete search history.

(56) References Cited

U.S. PATENT DOCUMENTS

| | | | |
|---|---|---|---|
| 3,488,928 A | 1/1970 | Tarala | |
| 5,800,581 A | 9/1998 | Gielink et al. | |
| 6,051,042 A | 4/2000 | Coulonvaux | |
| 6,099,606 A | 8/2000 | Miller et al. | |
| 6,231,630 B1* | 5/2001 | Ernst | B01D 46/0005 55/385.3 |
| 6,383,268 B2* | 5/2002 | Oda | B01D 46/0005 55/385.3 |
| 6,986,805 B2 | 1/2006 | Gieseke et al. | |
| 7,572,310 B2 | 8/2009 | Gieseke et al. | |
| 7,981,187 B2 | 7/2011 | Gieseke et al. | |
| 8,444,733 B2* | 5/2013 | Thienel | B01D 46/0005 55/385.3 |
| 2002/0046556 A1 | 4/2002 | Reid | |
| 2004/0084361 A1 | 5/2004 | Janik et al. | |
| 2010/0258493 A1* | 10/2010 | Kindkeppel | B01D 29/01 210/235 |
| 2011/0005988 A1* | 1/2011 | Bassett | B01D 27/08 210/232 |
| 2011/0232983 A1* | 9/2011 | Abe | B01D 46/0005 180/68.3 |
| 2012/0073252 A1* | 3/2012 | Lee | F02M 35/0203 55/385.3 |
| 2012/0118163 A1 | 5/2012 | Gorga | |
| 2013/0068319 A1* | 3/2013 | Plumptre | A61M 5/24 137/315.01 |
| 2013/0220555 A1* | 8/2013 | Wells | E06B 9/04 160/40 |
| 2014/0165512 A1* | 6/2014 | Horiuchi | F01M 13/04 55/322 |
| 2014/0251553 A1* | 9/2014 | Farntrog | E06B 9/52 160/99 |

* cited by examiner

FILTER WITH ENGINE INTEGRITY PROTECTION

CROSS-REFERENCE TO RELATED APPLICATIONS

This application is a U.S. national stage application claiming the benefit of International Application No. PCT/US2014/061125, filed on Oct. 17, 2014, which claims priority to U.S. Provisional Patent Application No. 61/894,805, filed Oct. 23, 2013 The entire contents of these applications are incorporated herein by reference in their entirety.

TECHNICAL FIELD

The present application relates to an air filter system for use in an engine or vehicle application.

BACKGROUND

In many applications, it is desirable to have different air filtration performance levels. For example, high-efficiency nanofiber grade filtration may be desired for certain engines, but other engines may not require the same level of efficiency. Air filter manufacturers often standardize element shapes and sizes to minimize costs and maintain high production volumes. A common air filter design includes an arrangement where the lengths of standardized elements are modified to satisfy a variety of desired engine air flow rates. Also, air filter media grades may be substituted within any given element size to satisfy higher or lower filtration efficiency performance requirements. This standardization approach creates the potential for a filter element to be installed in a housing for which it was not intended. For example, shorter elements may appear to fit properly in a housing designed for longer elements, but the shorter elements do not reach the sealing pocket at the bottom of the housing reducing filtration performance. Alternatively, a high-efficiency version of a standardized filter element may look substantially the same as the standard grade version with the minor exception of a part number. Thus, it may be easy for a service technician to install the wrong element in a filter housing. The use of a filter element with the incorrect performance or length may result in a degradation of engine performance or permanent damage to the engine.

SUMMARY

Various embodiments relate to an filter system including a designated filter element including a geometric projection thereon and a filter element housing including an opening keyed to the geometric projection. The geometric projection may engage the opening when the designated filter element is installed in the filter element housing. The filter element housing includes a filter housing body and a filter housing cover.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Various exemplary embodiments relate to a filter element, for example an air filter element, that incorporates positive mechanical elements for the purpose of preventing installation of an incorrect filter element in a filter housing comprising a housing body and a housing cover. The filter element and filter housing system may be employed in any appropriate vehicle or engine application. According to one embodiment, the filter element and housing system may be employed in a diesel engine application.

According to an exemplary embodiment, the filter element includes geometrical features that correspond to features of a filter housing. For example, the filter element may include a filter frame which includes a geometric projection that corresponds to an opening or recess of the filter housing, preventing filter elements lacking the correct geometric projection from being installed in the filter housing. In one embodiment, the opening may be a channel or slot of the filter housing. The system may prevent the installation of an incorrect filter in a filter housing as a result of the interaction between the geometric projections provided on the filter element and the filter housing. Additionally, the geometric projections may ensure that the desired seal interface between the filter element and the filter housing is achieved.

Figure 1:
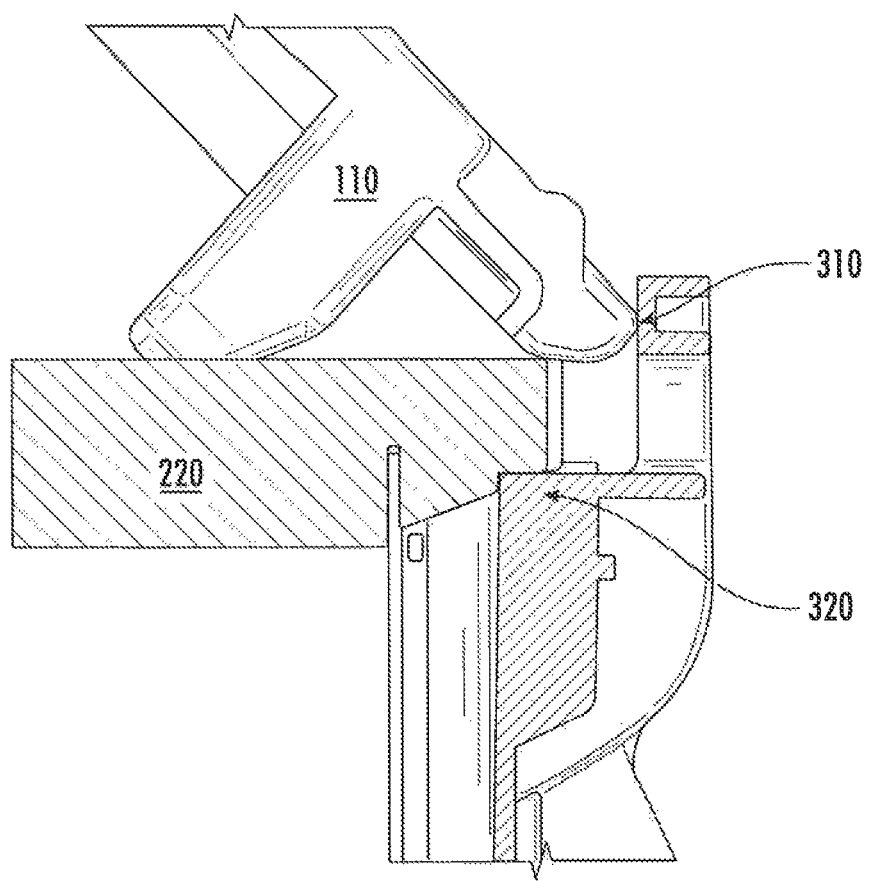
FIG. 1 is a side view of an incorrect filter element installed in a filter housing according to one embodiment.

According to an exemplary embodiment, a geometric projection of the filter element may prevent the installation of the filter element in a filter element housing that does not include a channel or slot that corresponds to the geometric projection. As illustrated in FIG. 1, a filter element 220 may be placed in a filter housing body 320 that lacks a corresponding channel or slot, and the geometric projections of the filter element may contact a portion of the filter housing body 320, preventing the filter element 220 from reaching the correct installation location within the filter housing body 320. The filter housing body 320 may include a filter housing cover 110, and a portion 310 of the filter housing cover 110 may be prevented from reaching the proper installation location by contact with incorrect filter element 220.

Figure 2:
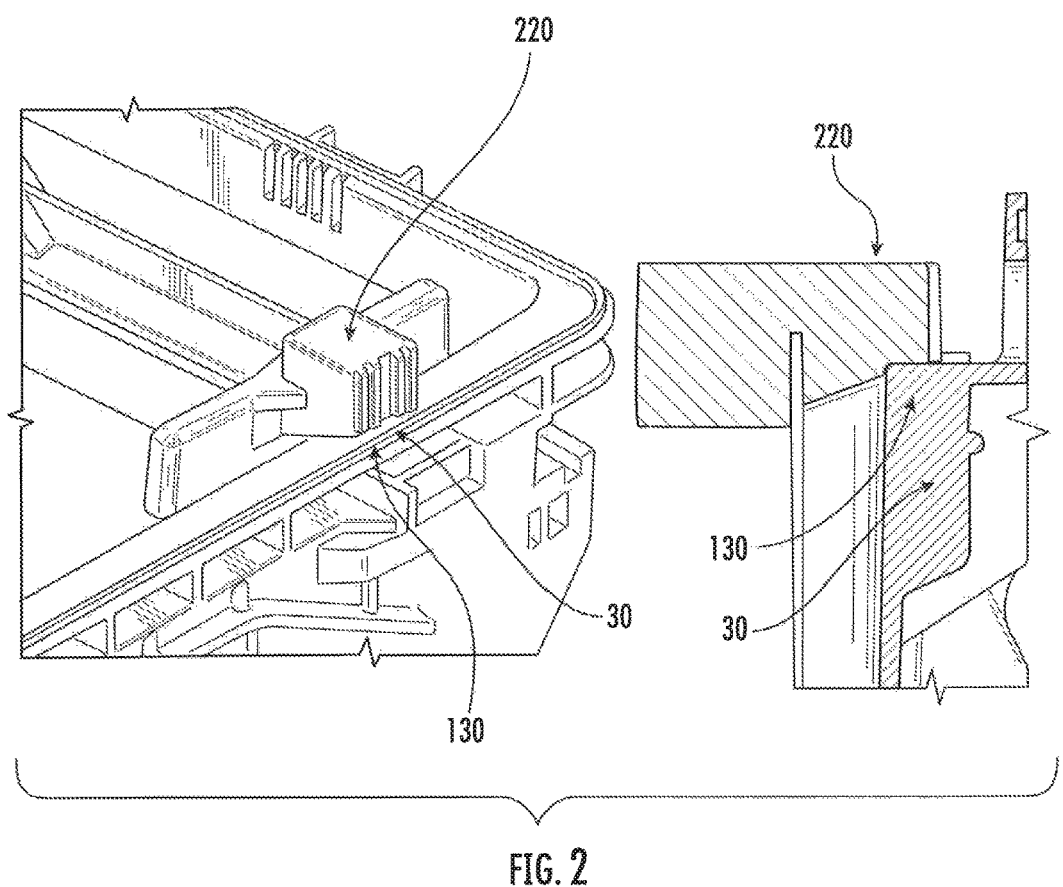
FIG. 2 is perspective and cross-section view of an incorrect filter element installed in a filter housing according to one embodiment.

As illustrated in FIG. 2, an "incorrect" filter element 220 may be placed in a filter housing body 130 that does not include a channel or slot that corresponds to the geometric projection of the filter element 220. In an exemplary embodiment, a rib 30 may be provided in the filter housing body 130 that contacts the incorrect filter element 220 having a geometric projection that does not include a corresponding space or void, and prevents the incorrect filter element 220 from being installed in the filter housing body 130.

Figure 3:
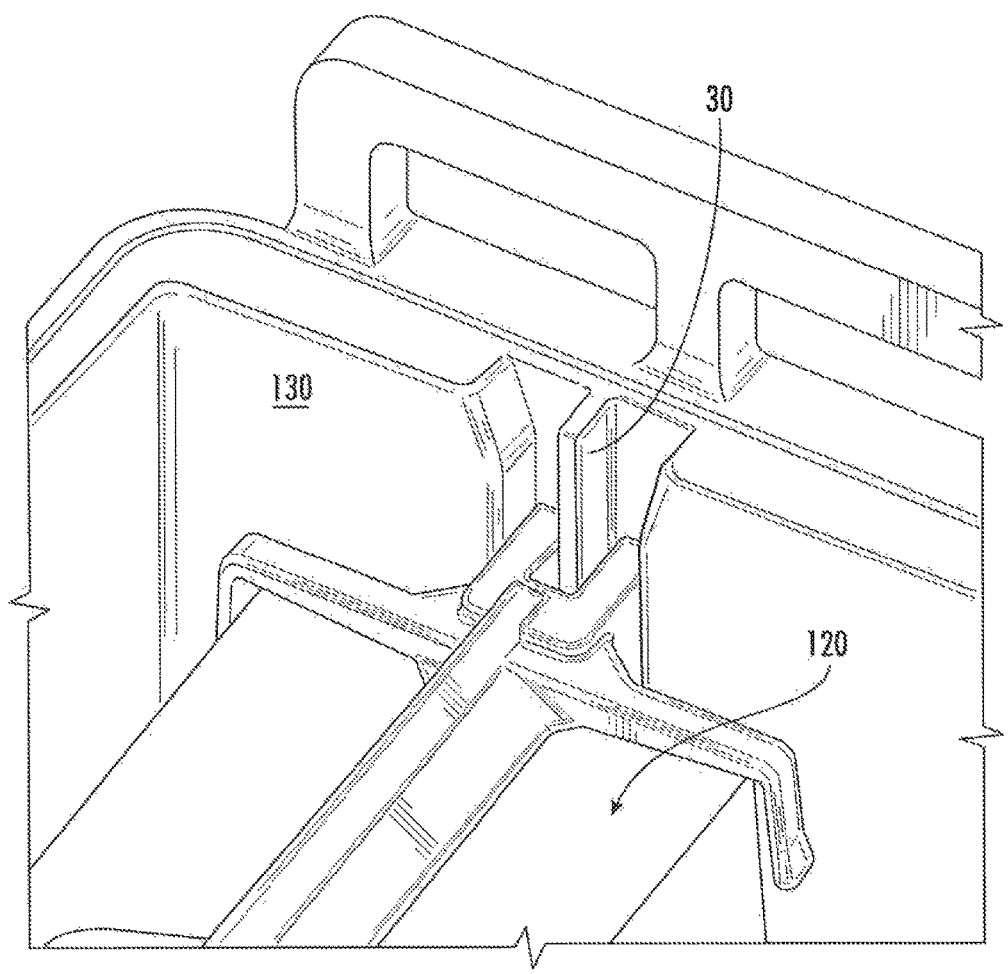
FIG. 3 is a perspective view of a filter element installed in the correct filter housing according to one embodiment.
Figure 4:
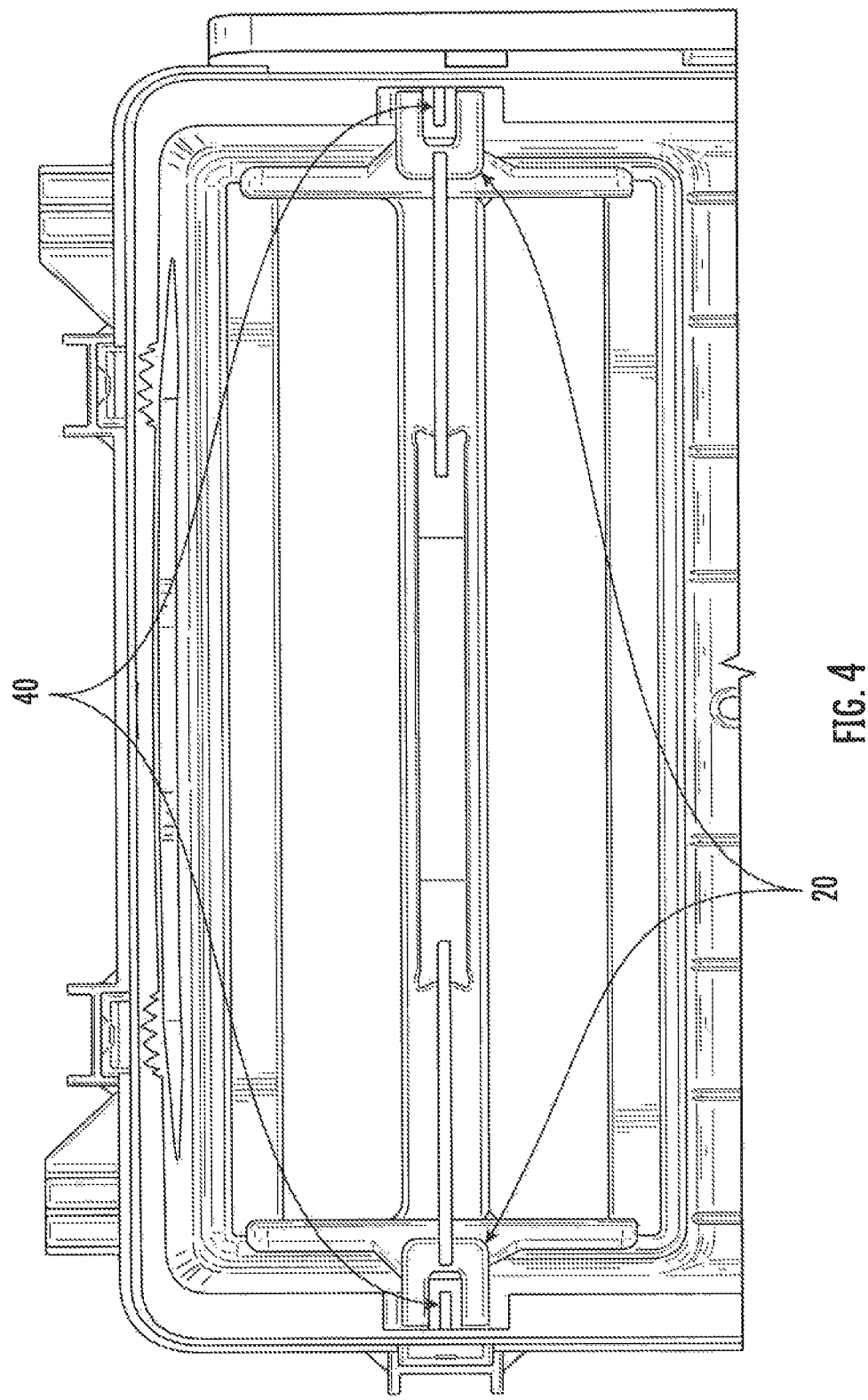
FIG. 4 is a top view of a filter element installed in the correct filter housing according to one embodiment.
Figure 5A:
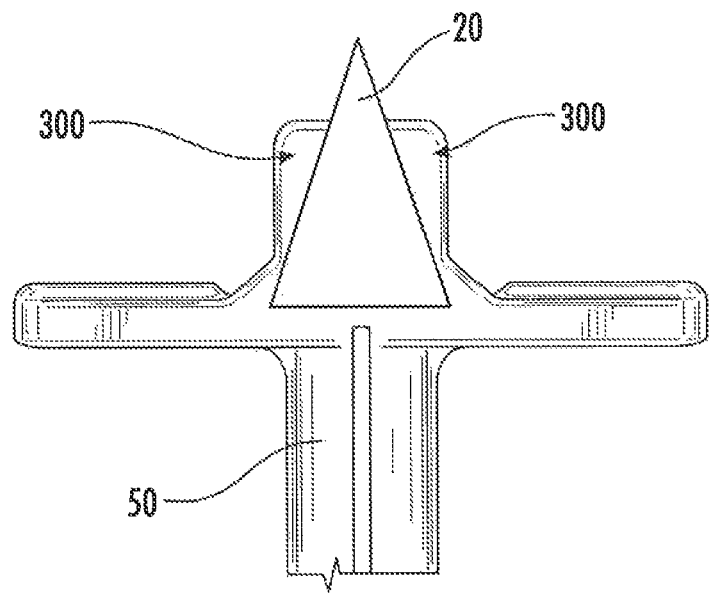
FIGS. 5(a)-(h) illustrate various filter frame designs according to various exemplary embodiments.
Figure 5B:
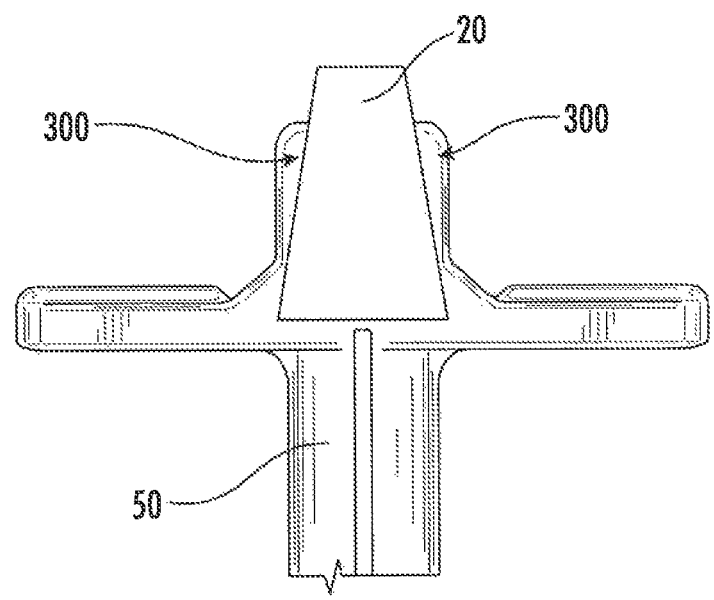
Figure 5C:
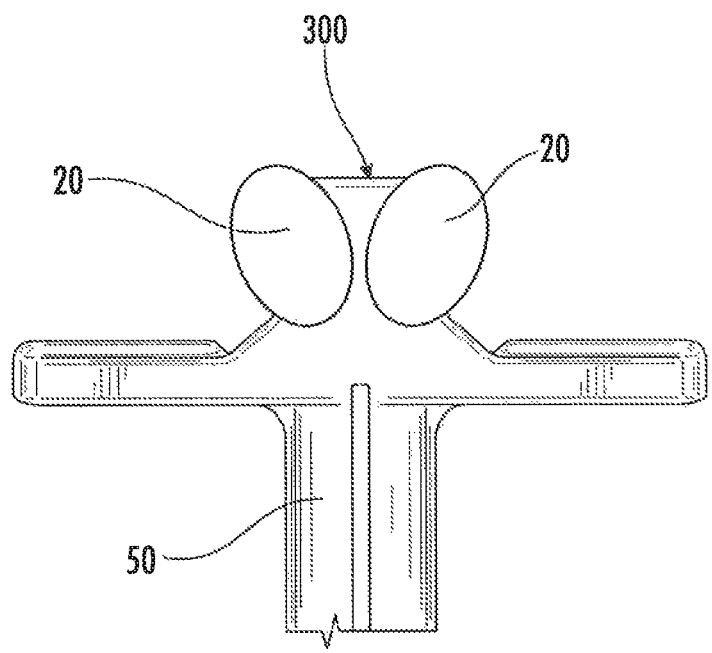
Figure 5D:
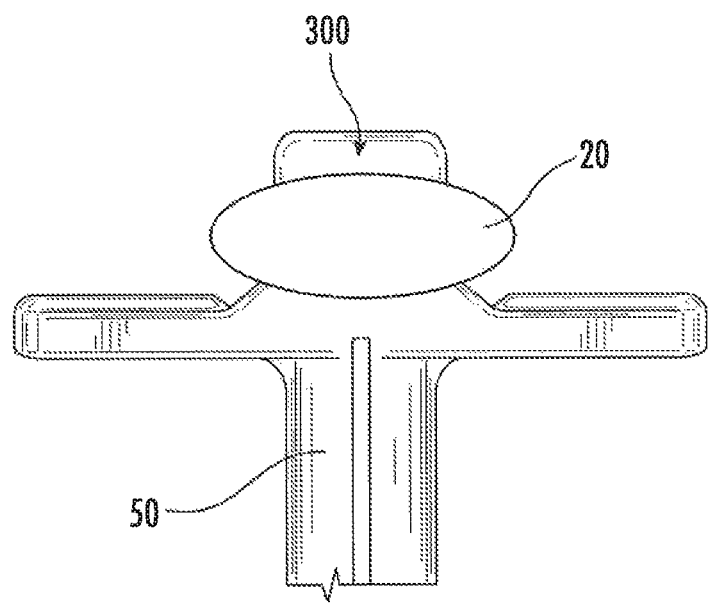
Figure 5E:
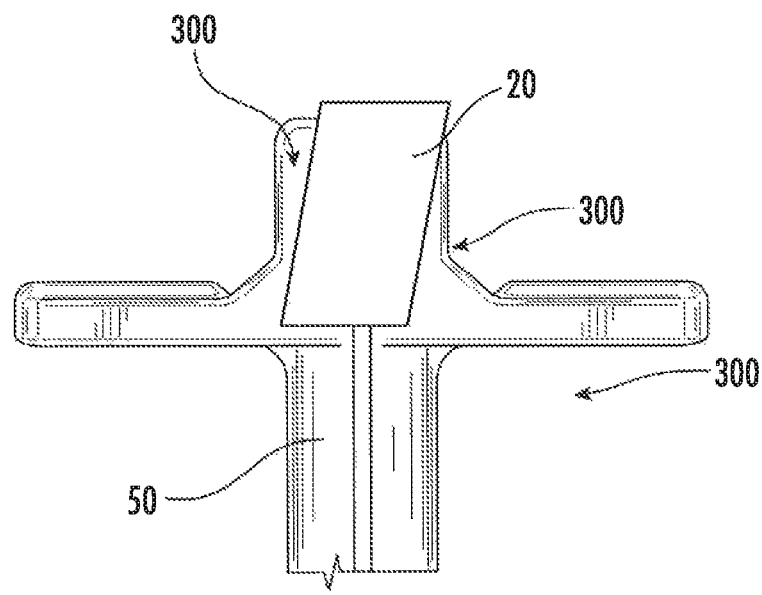
Figure 5F:
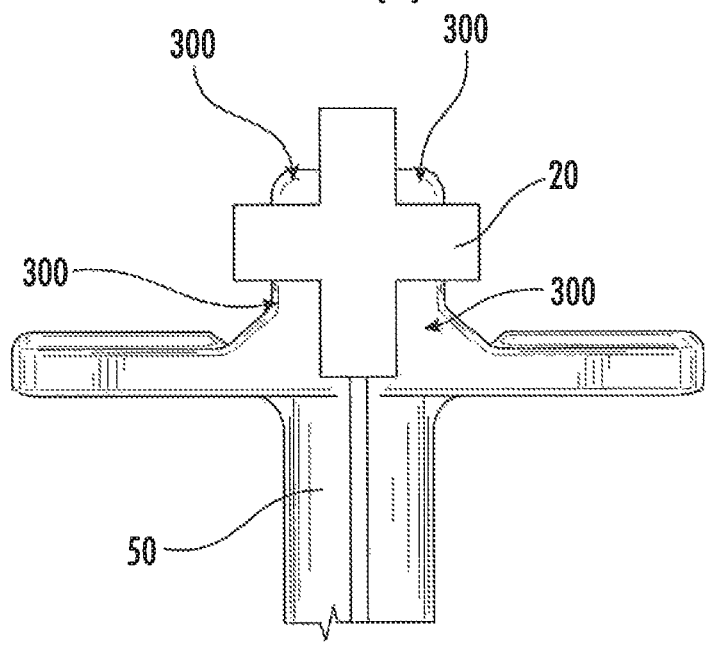
Figure 5G:
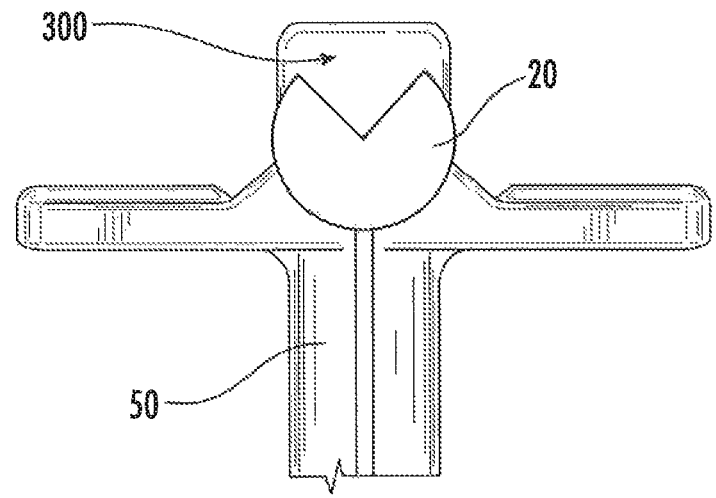
Figure 5H:
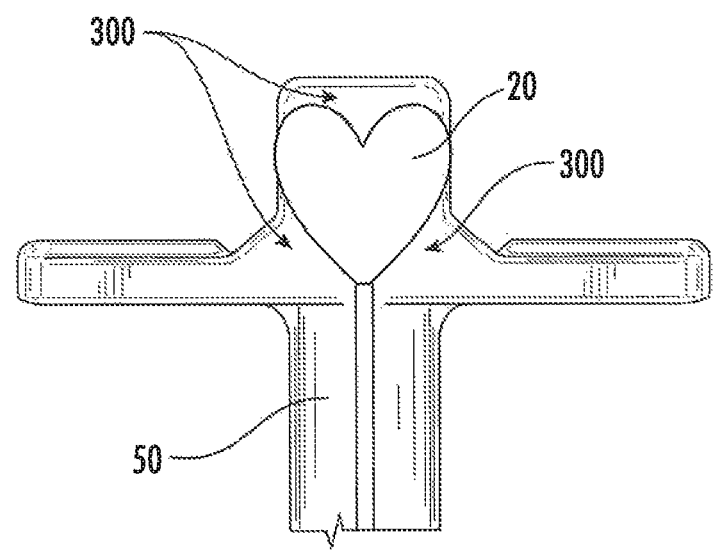

As illustrated in FIG. 3, a "correct" filter element 120 may be installed in a filter housing body 130 that includes a channel or slot that corresponds to the geometric projection of the correct filter element 120. In an exemplary embodiment, a rib 30 may be provided in the filter housing body 130 and the geometric projection of filter element 120 may include a space or void that corresponds to the rib 30 such that the rib 30 does not contact the geometric projection of the filter element in a manner that prevents the installation of filter element 120 in the filter housing body 130. As illustrated in FIG. 4, the filter element 120 with geometric projections 20 that correspond to the contours of the channels or slots 40 of the filter housing may be installed in the filter housing body 130 without interference.

According to an exemplary embodiment, the geometric projections of the filter element may have any appropriate shape. The geometric projections may be provided on a frame of the element. In one embodiment, the geometric projections may be provided on the periphery of a polymer filter element frame. The filter frame may be formed from any suitable material, such as a plastic material, a hard urethane material, a soft urethane material, and a metal material. The geometric projections may be provided on a rigid filter element frame, preventing mechanical advantage produced during installation from crushing the filter and forcing an incorrect filter in to the filter housing. The geometric projections may engage with a mating channel or slot in the filter housing. A geometric projection of a filter element that mates with a channel or slot in the filter housing may be considered to be "keyed" to the corresponding channel or slot in the filter housing.

In one exemplary embodiment, the geometric projections may be provided on a top frame of the filter element. FIGS. 5(a)-(h) illustrate geometric projections 20 of various designs extending from a top frame 50 of the filter element. In various exemplary embodiments, the geometric projections may have a triangular, trapezoidal, double lobed, oval, parallelogram, T or cross-shaped, pie-shaped, or heart-shaped design, as depicted in FIGS. 5(a)-(h), respectively. Additionally, the areas of interference 300 between geometric projections 20 of various shapes and a rectangular channel or slot in the filter housing are illustrated in FIGS. 5(a)-(h). According to another exemplary embodiment, the geometric projection may be rectangular or square in shape.

According to an exemplary embodiment, a cascading approach may be employed for the design of the geometric projection of the filter element when a standard filter element design is provided with various lengths or filtration performance levels. In such an embodiment, a "short" filter element may be provided with a geometric projection design that will not allow installation in a housing intended for a "medium-length" or "long" filter element. A "long" filter element may be provided with a geometric projection that may fit the channel or slot provided in the "short" housing.

In such a situation the excess length of the "long" filter would cause at least a portion of the filter element to protrude above the filter housing and prevent installation of the filter housing cover. Similarly, a "low-performance" filter element may be provided with a geometric projection design that will not allow installation in a housing intended for a "high-performance" filter element of the same size. A "high-performance" filter element may be provided with a geometric projection that may fit the channel or slot provided in the "low-performance" housing, as typically degradation of engine performance and engine damage do not result from installation of a "high-performance" filter element in a housing designed for a "low-performance" filter element. According to an exemplary embodiment, a cascading approach may utilize geometric projections of the same geometric shape with various sizes. In another embodiment, a cascading approach may utilize geometric projections of various geometric shapes.

In one exemplary embodiment, a tab/slot design may be utilized for the geometric projections and the channel or slot in the filter housing. A simple tab may be provided for a filter element of "standard" or "low" filtration performance that mates with a corresponding slot in the filter housing. A housing for a "medium" or "high" performance filter element of the same size may be provided with an additional unique feature or features in the channel or slot that prevent installation of the "standard" or "low" performance filter elements. In one embodiment, the additional unique feature may be a rib or ribs within the filter housing slot that prevent installation of filter elements lacking the appropriately keyed geometric projection. Additional unique features of the filter housing channel or slot may be provided in any appropriate size, shape, quantity, or combination thereof.

Figure 6C:
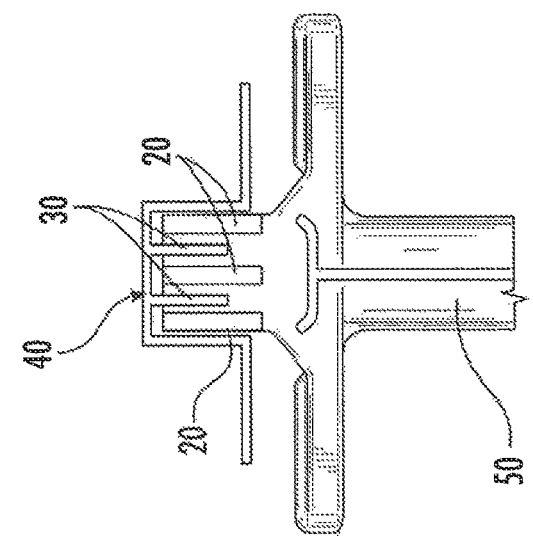
FIGS. 6(a)-(c) illustrate various filter frame designs and the corresponding housings according to various exemplary embodiments.
Figure 6B:
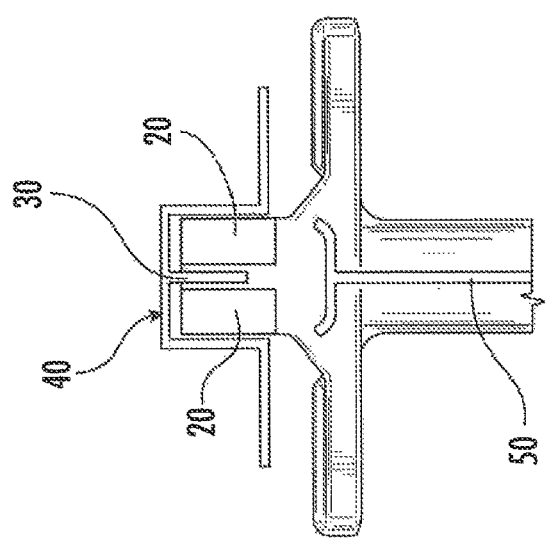
Figure 6A:
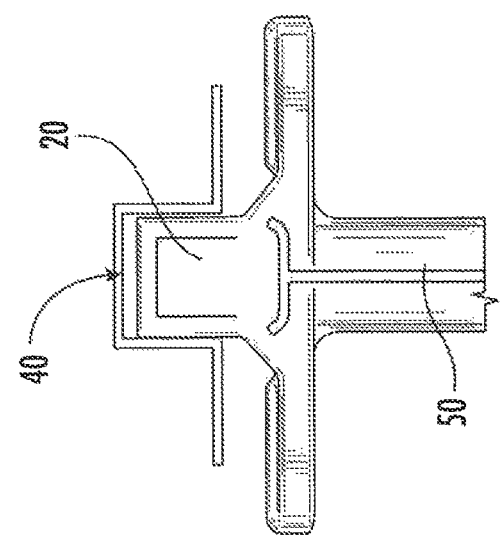

FIGS. 6(a)-(c) depict a variety of different geometric projections 20 of a filter element top frame 50 keyed to different housing slot designs 40. FIG. 6(a) depicts a geometric projection 20, or tab, keyed to a housing slot 40. FIG. 6(b) depicts a housing slot 40 of the same general shape as the housing slot of FIG. 6(a) with rib 30 provided as an additional unique feature, and geometric projections 20 keyed to housing slot 40, including the rib 30. FIG. 6(c) depicts a housing slot 40 of the same general shape as the housing slots of FIGS. 6(a) and 6(b) with multiple ribs 30 provided as an additional unique features, and geometric projections 20 keyed to housing slot 40, including the ribs 30. In one embodiment, the filter element and housing slots depicted in FIG. 6(a) may be a "standard" or "low" performance filter element, the filter element and housing depicted in FIG. 6(b) may be a "medium" performance filter element, and the filter element and housing depicted in FIG. 6(c) may be a "high" performance filter element. Similarly, the filter elements and housing slots depicted in FIGS. 6(a)-(c) may be a "short," "medium," and "long" length filter element, respectively.

Figure 7C:
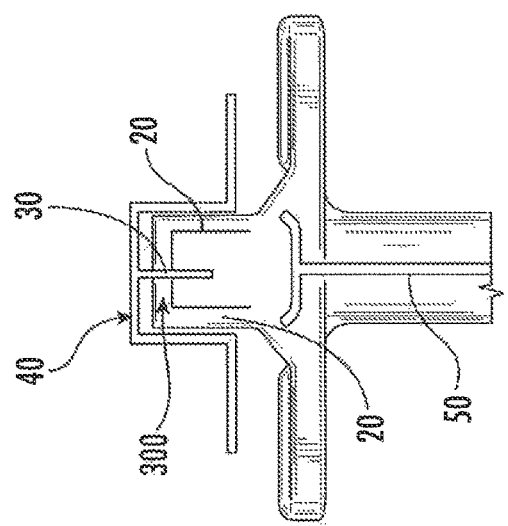
FIGS. 7(a)-(c) illustrate various filter frame designs interacting with incorrect housings according to various exemplary embodiments.
Figure 7B:
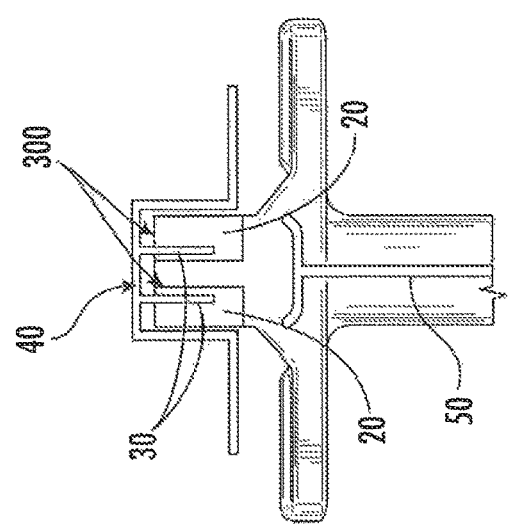
Figure 7A:
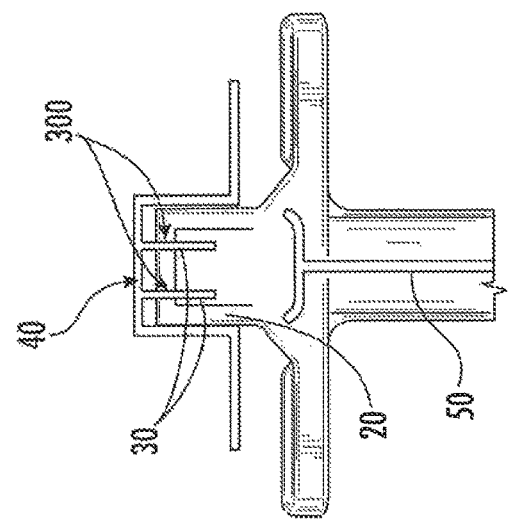

FIGS. 7(a)-(c) depict a variety of different geometric projections 20 of a filter element top frame 50 placed in housing slot designs 40 to which the geometric projections are not keyed and the regions of interference 300 that result. FIG. 7(a) depicts the regions of interference 300 that result when a "low" performance filter with geometric projection 20 keyed to the filter housing slot depicted in FIG. 6(a) is placed in a "high" performance filter housing, as depicted in FIG. 6(c). FIG. 7(b) depicts the regions of interference 300 that result when a "medium" performance filter with geometric projection 20 keyed to the filter housing slot depicted in FIG. 6(b) is placed in a "high" performance filter housing, as depicted in FIG. 6(c). FIG. 7(c) depicts the regions of interference 300 that result when a "low" performance filter with geometric projection 20 keyed to the filter housing slot depicted in FIG. 6(a) is placed in a "medium" performance filter housing, as depicted in FIG. 6(b). As depicted in FIGS. 7(a)-(c), the geometric projections and filter housing slot designs may be such that a lower performance filter may not be installed in a filter housing intended for a higher performance filter.

Figure 8:
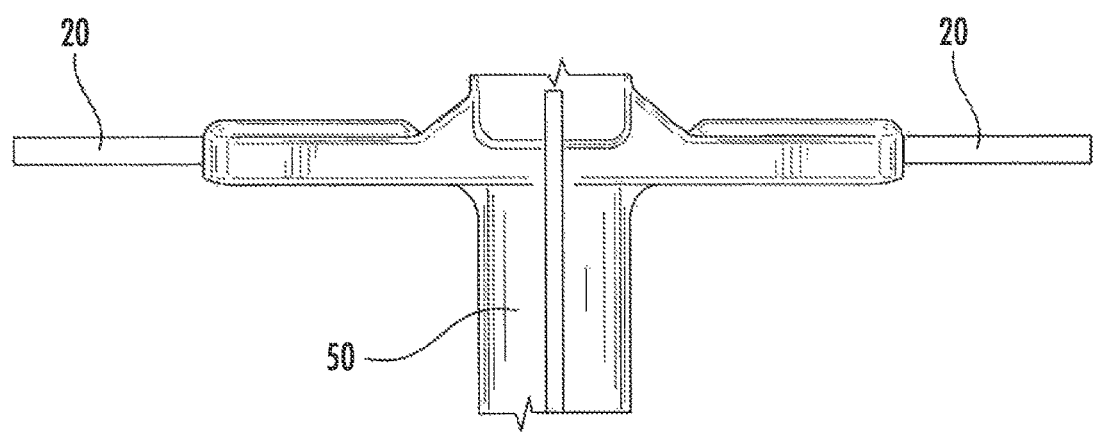
FIG. 8 illustrates a filter frame design according to an exemplary embodiment.
Figure 9:
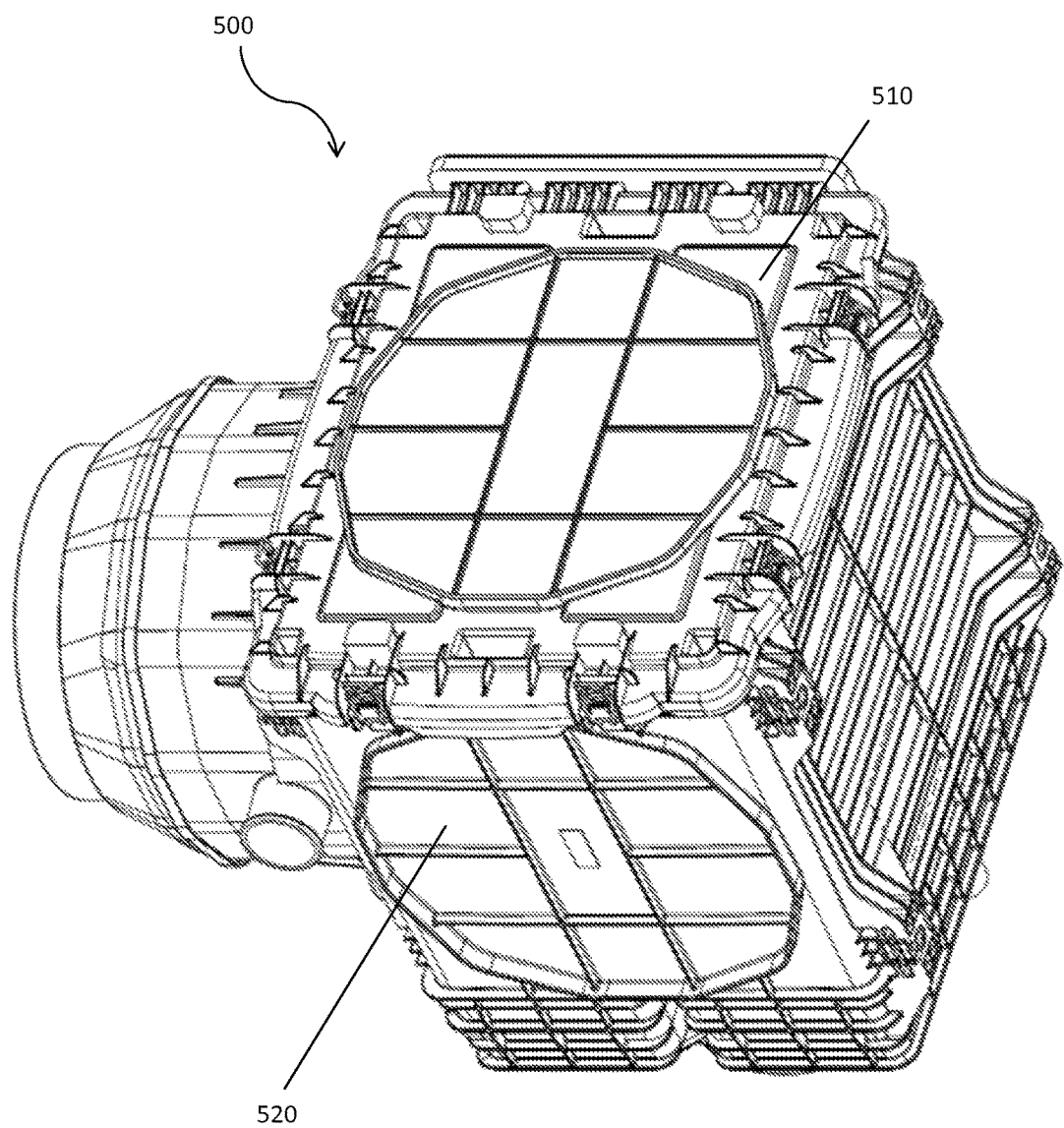
FIG. 9 illustrates a perspective view of a filter element housing according to another exemplary embodiment.

According to an exemplary embodiment, the geometric projections may be provided at any appropriate portion of the filter element. In one embodiment, the geometric projections may be provided at a periphery of a filter element frame. According to another embodiment, the geometric projections may be provided at the distal ends of a central support rib of a filter element top frame. In another embodiment, the geometric projections may extend along the longitudinal axis of a filter element. In yet another embodiment, the geometric projections may extend in a direction orthogonal to the longitudinal axis of a filter element. The longitudinal axis of the filter element may extend along a major axis of the filter element frame. Alternatively, the longitudinal axis of the filter element may extend along a major axis of a filter media of the filter element. FIG. 8 depicts an exemplary embodiment in which the geometric projections 20 extend in a direction orthogonal to the longitudinal axis of filter element top frame 50, and the geometric projections 20 are located at the distal ends of an end-cap or cross-member of top frame 50.

According to various embodiments, any appropriate number of geometric projections may be provided on the filter element. For example, one or more (e.g., two, three, four, five, six, or more) geometric projections may be provided on the filter element. Additionally, any appropriate number of channels or slots may be provided in the filter element housing. For example, one or more (e.g., two, three, four, five, six, or more) channels or slots may be provided on the filter element housing. The filter element housing may be provided with the same number of channels or slots as the number of geometric projections provided on the filter element. In another embodiment, the filter element housing may be provided with a different number (e.g., more or less) of channels or slots than the number of geometric projections provided on the filter element.

Figure 10:
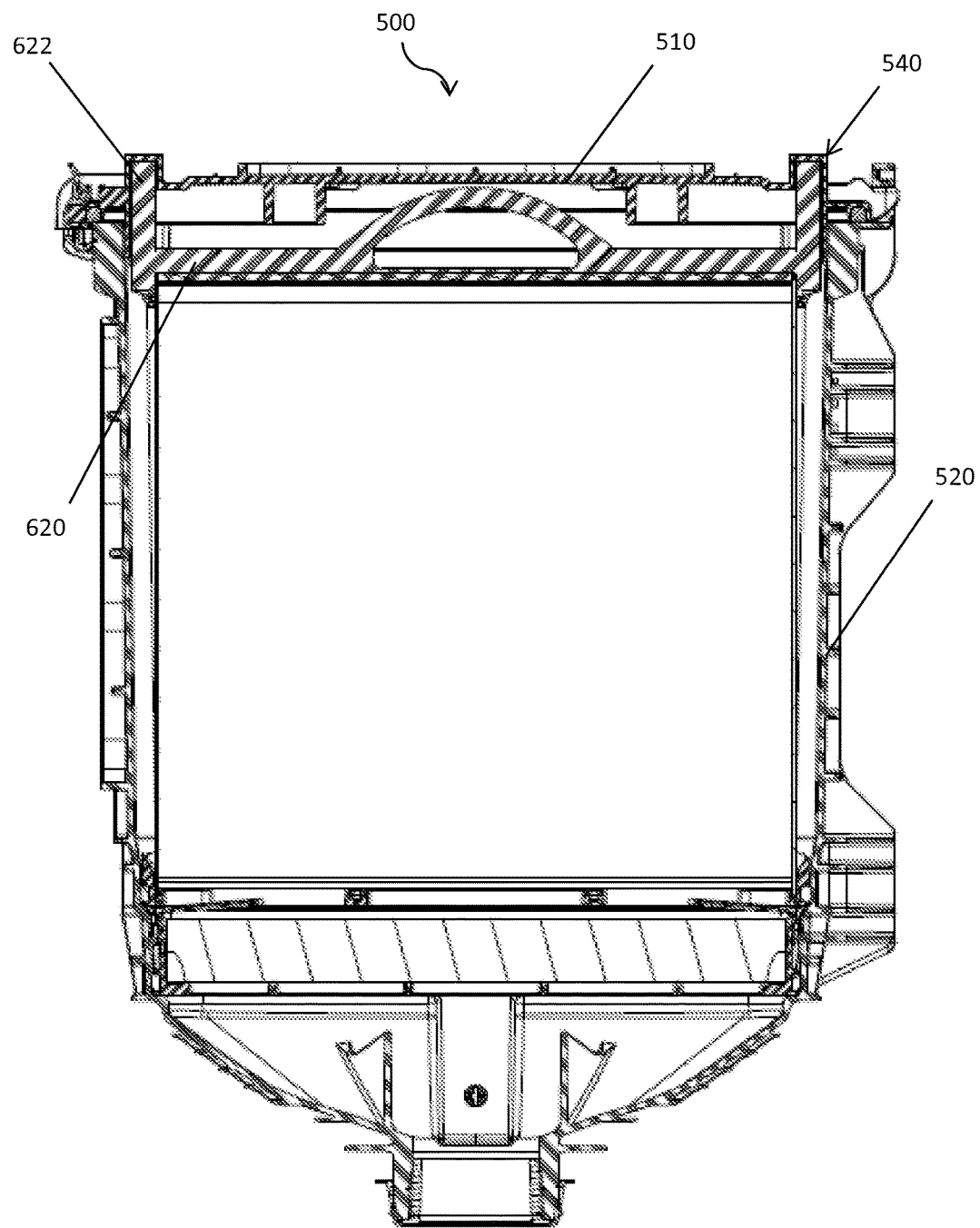
FIG. 10 illustrates a cross-section view of a filter system including the filter element housing of FIG. 9.
Figure 11:
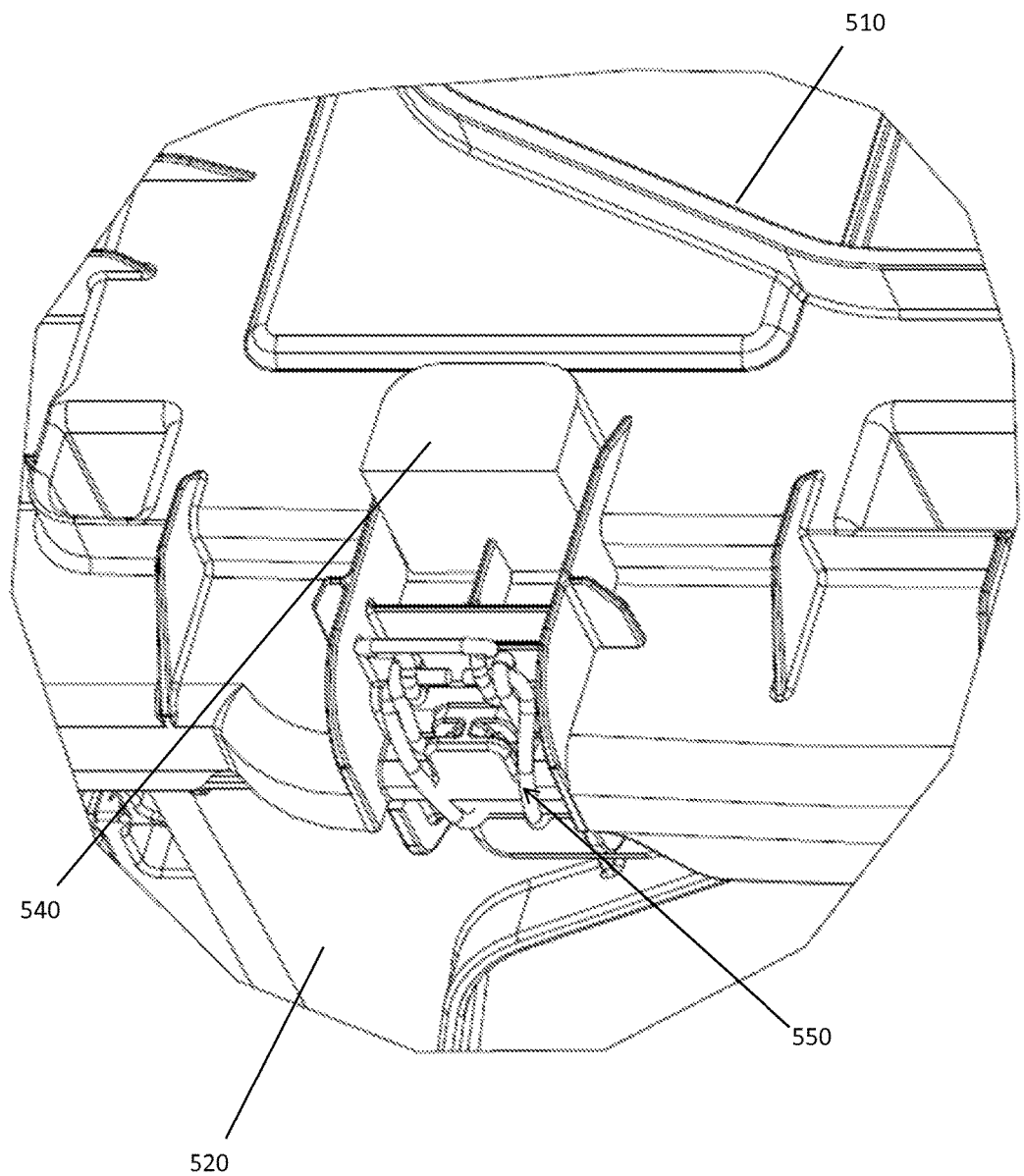
FIG. 11 illustrates a detail perspective view of a portion of the filter element housing of FIG. 9.

FIGS. 9-13 depict an exemplary embodiment in which the openings of the filter housing 500 are provided in the filter housing cover 510 that seals to the filter housing body 520. As shown in FIG. 10, a filter element 620 including geometric projections 622 may be installed in the filter housing 500. The filter housing cover 510 includes voids or recesses 540 that correspond to the geometric projections 622 of the filter element 620. An attachment mechanism 550 may be provided to attach the filter housing cover 510 to the filter housing body 520. As shown in FIG. 11, the attachment mechanism 550 may be provided on the filter housing cover 510 and the voids or recesses 540 formed in the filter housing cover may be observed from the exterior of the filter housing. The geometric projections 622 may extend in a direction along a major axis of a filter media of the filter element 620. The shape and number of the geometric projections and the corresponding openings may be as described for any of the embodiments described herein.

Figure 12:
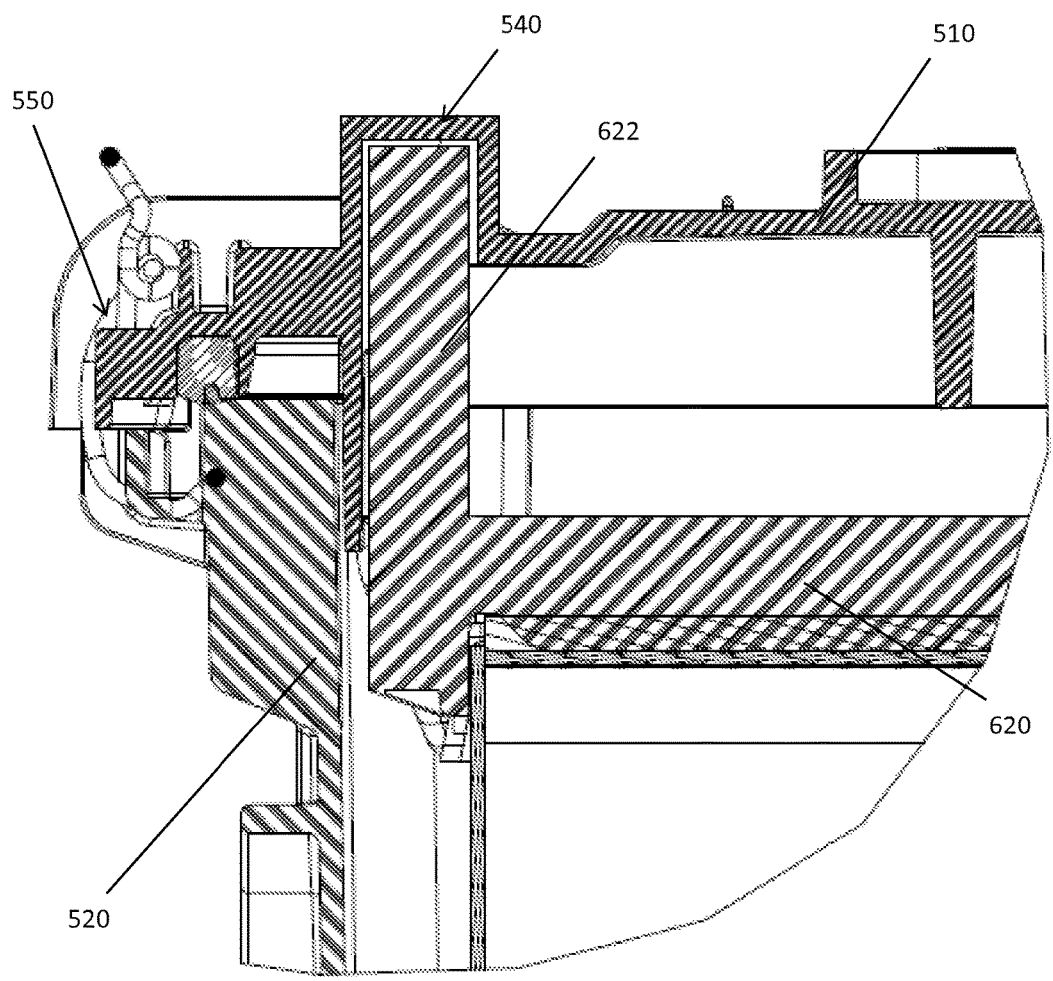
FIG. 12 illustrates a detail cross-section view of a correct filter element installed in a the filter housing of FIG. 9.

The interaction of the filter housing cover 510, the filter housing body 520, and a "correct" filter element 620 is shown in FIG. 12. The recess 540 of the filter housing cover 510 has a size and shape corresponding to the geometric projections 622 such that the filter housing cover 510 may be sealed against the filter housing body 520 when the filter element is installed in the filter housing. The attachment mechanism 550 is capable of securing the filter housing cover 510 to the filter housing body 520 when the "correct" filter element 620 is installed.

Figure 13:
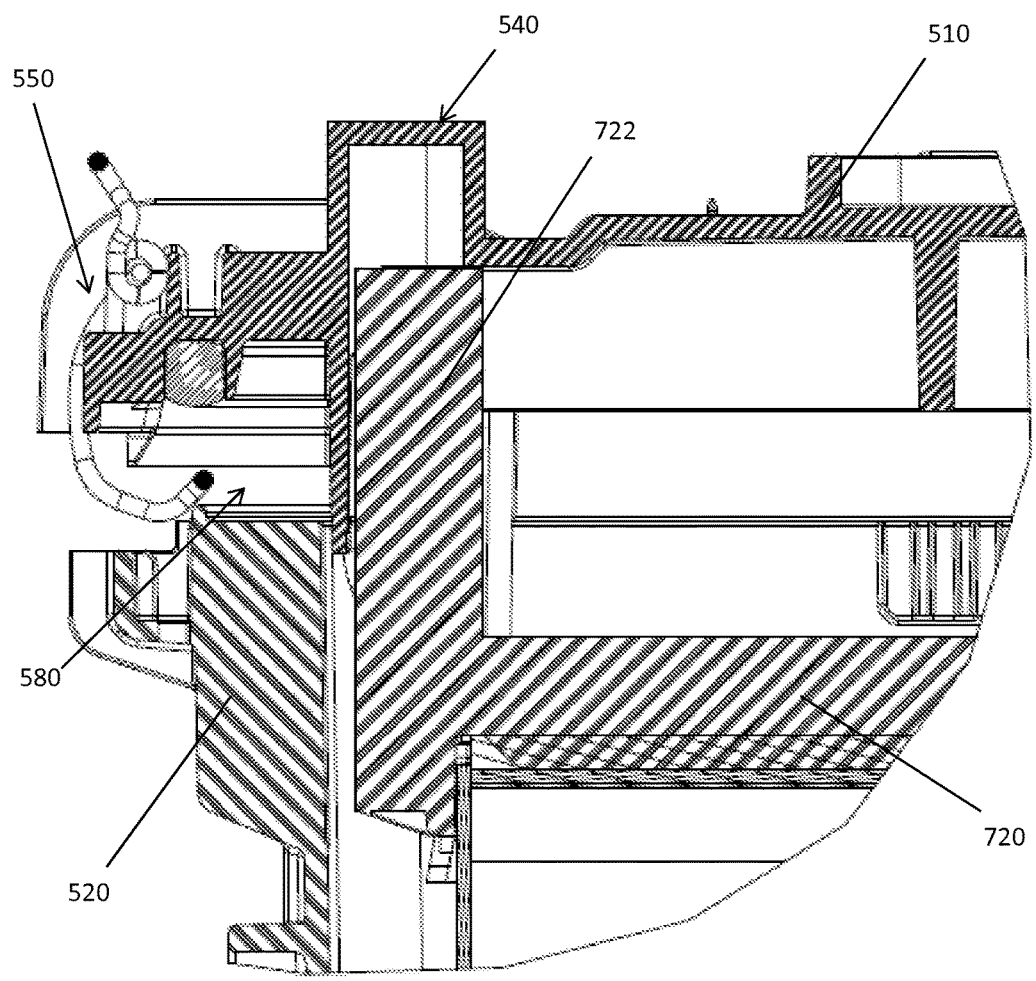
FIG. 13 illustrates a detail cross-section view of an incorrect filter element installed in the filter housing of FIG. 9.

The interaction of the filter housing cover 510, the filter housing body 520, and an "incorrect" filter element 720 is shown in FIG. 13. The geometric projections 722 of the "incorrect" filter element 720 are of a size and shape such that the geometric projections 722 do not correspond to the recesses 540 of the filter housing cover 510. The interference of the geometric projections 722 with the filter housing cover 510 prevent the filter housing cover from sealing against the filter housing body 520, such that a gap 580 is formed between the filter housing cover 510 and the filter housing body 520. The gap 580 prevents the attachment mechanism 550 from securing the filter housing cover 510 to the filter housing body 520.

According to an exemplary embodiment, the filter element may be of any appropriate filter element construction. In one embodiment, the filter element may be a direct flow filter element. A direct flow filter element may include a filter element in which the fluid to be filtered flows substantially in an axial direction through the filter element. In some cases, a direct flow filter may include a filter element in which the fluid to be filtered flows substantially straight through the filter element. In one embodiment, a direct flow filter may include a V-shaped filter media pack as described in U.S. Pat. Nos. 6,375,700 and 6,482,247, the contents of each reference being incorporated by reference herein in their entirety. According to another embodiment, the filter element may be a coiled, layered, or other filter element construction.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A filter system comprising:
a designated filter element comprising a filter element frame including a geometric projection extending therefrom along a longitudinal axis of the designated filter element the geometric projection comprising a gap portion; and
a filter element housing including an opening keyed to the geometric projection, wherein the opening comprises a recess, a channel or a slot, wherein the recess, the channel, or the slot includes a rib positioned within the opening and extending away from the recess, the channel, or the slot along the longitudinal axis, the rib keyed to the gap portion of the geometric projection;
wherein the geometric projection engages the opening when the designated filter element is installed in the filter element housing, and wherein the filter element housing comprises a filter housing body and a filter housing cover.

2. The system of claim 1, wherein the recess, channel or slot has a form such that non-designated filter elements with higher performance than the designated filter element may be installed in the filter housing.

3. The system of claim 1, wherein the recess, channel or slot has a form such that non-designated filter elements with lower performance than the designated filter element are prevented from installation in the filter housing.

4. The system of claim 1, wherein the recess, channel or slot has a form such that non-designated filter elements with a shorter length than the designated filter element are prevented from installation in the filter housing.

5. The system of claim 1, wherein the geometric projection consists of one of a rectangular, square, triangular, trapezoidal, double lobed, oval, parallelogram, T-shaped, cross-shaped, pie-shaped, and heart-shaped form.

6. The system of claim 1, wherein the designated filter element comprises a direct flow filter element.

7. The system of claim 1, wherein the designated filter element comprises a plurality of geometric projections.

8. A filter element comprising:
a filter element frame;
a filter media; and
a geometric projection extending from the filter element frame along a longitudinal axis of the filter element, the geometric projection comprising a gap portion, the geometric projection, configured to engage an opening of a designated filter element housing when the filter element is installed in the designated filter element housing, the opening including a rib within the opening and extending away from the opening along the longitudinal axis, the geometric projection keyed to the opening and gap portion keyed to the rib.

9. The filter element of claim 8, wherein the geometric projection consists of one of a rectangular, square, triangular, trapezoidal, double lobed, oval, parallelogram, T-shaped, cross-shaped, pie-shaped, and heart-shaped form.

10. The filter element of claim 8, wherein the filter element comprises a direct flow filter element.

11. The filter element of claim 8, wherein the filter element comprises a plurality of geometric projections.

12. A filter element housing comprising:
a filter element housing body and a filter element housing cover, wherein the filter element housing includes an opening keyed to a geometric projection of a designated filter element, the opening comprises a recess, a channel, or a slot including a rib positioned within the opening and extending, away from the recess, the channel, or the slot along the longitudinal axis, the rib keyed to a gap portion of the geometric projection, and the opening is configured to engage the geometric projection extending from the designated filter element along a longitudinal axis of the designated filter element when the designated filter element is installed in the filter element housing.

13. The filter element housing of claim 12, wherein the recess, channel or slot has a form such that non-designated filter elements with higher performance than the designated filter element may, be installed in the filter housing.

14. The filter element housing of claim 12, wherein the recess, channel or slot has a form such that non-designated filter elements with lower performance than the designated filter element are prevented from installation in the filter housing.

15. The filter element housing of claim 12, wherein the recess, channel or slot has a form such that non-designated filter elements with a shorter length than the designated filter element are prevented from installation in the filter housing.

* * * * *